(12) United States Patent
Yamaguchi et al.

(10) Patent No.: US 11,440,636 B2
(45) Date of Patent: Sep. 13, 2022

(54) FUEL TANK DAM

(71) Applicant: MITSUBISHI HEAVY INDUSTRIES, LTD., Tokyo (JP)

(72) Inventors: Eizaburo Yamaguchi, Tokyo (JP); Tadasuke Kurita, Nagoya (JP); Hajime Tada, Tokyo (JP); Yoko Taguchi, Nagoya (JP); Kana Sakon, Tokyo (JP); Akihisa Okuda, Tokyo (JP); Ryoji Okabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 245 days.

(21) Appl. No.: 16/614,913

(22) PCT Filed: Jun. 28, 2018

(86) PCT No.: PCT/JP2018/024659
§ 371 (c)(1),
(2) Date: Nov. 19, 2019

(87) PCT Pub. No.: WO2019/013012
PCT Pub. Date: Jan. 17, 2019

(65) Prior Publication Data
US 2020/0189715 A1    Jun. 18, 2020

(30) Foreign Application Priority Data
Jul. 12, 2017   (JP) .............................. JP2017-136195

(51) Int. Cl.
*B64C 3/34*        (2006.01)
(52) U.S. Cl.
CPC .................................... *B64C 3/34* (2013.01)

(58) Field of Classification Search
CPC .... B64C 3/34; B64C 3/18; B64C 7/00; B64D 37/08; B64D 37/005; B64D 37/02; B64D 37/04; B64D 37/06; B64F 5/10
See application file for complete search history.

(56) References Cited

U.S. PATENT DOCUMENTS

| 8,167,245 B1 * | 5/2012 | Koehler | ................... B64C 3/34 244/123.1 |
| 2014/0284426 A1 * | 9/2014 | Erickson | ................... B64C 1/06 244/135 R |

(Continued)

FOREIGN PATENT DOCUMENTS

| EP | 2502824 A2 | 9/2012 |
| EP | 3012186 A1 | 4/2016 |
| JP | 2015054581 A | 3/2015 |

OTHER PUBLICATIONS

International Search Report and Written Opinion of International Application No. PCT/JP2018/024659 dated Sep. 18, 2018; 11pp.

*Primary Examiner* — Joshua J Michener
*Assistant Examiner* — Cindi M Curry
(74) *Attorney, Agent, or Firm* — Kanesaka Berner and Partners LLP

(57) ABSTRACT

A fuel tank dam comprises a first section, a second section, a third section, and a flange section. The first section can be fixed to a first structural component, and the second section can be fixed to a second structural component. The third section has a bellows comprising a plurality of folded sections and is disposed between the first section and the second section. The flange section extends along an outer plate at least from an edge section of the third section and can be fixed to the outer plate.

8 Claims, 6 Drawing Sheets

(56) References Cited

U.S. PATENT DOCUMENTS

2016/0159490 A1* 6/2016 Yamaguchi ............ B64D 37/08
                                                                220/734
2016/0355273 A1* 12/2016 Perez Diaz ............... B64C 3/34
2020/0278026 A1* 9/2020 Peacock .................... B64C 3/34

* cited by examiner

FUEL TANK DAM

RELATED APPLICATIONS

The present application is a National Phase of International Application Number PCT/JP2018/024659 filed Jun. 28, 2018 and claims priority to Japanese Application Number 2017-136195 filed Jul. 12, 2017.

TECHNICAL FIELD

The present invention relates to a fuel tank dam.

Priority is claimed on Japanese Patent Application No. 2017-136195 filed on Jul. 12, 2017, the content of which is incorporated herein by reference.

BACKGROUND ART

In an aircraft, a fuel tank is provided in a main wing or the like. The fuel tank is composed of a plurality of structural members such as a skin, a stringer, and a rib. In such a fuel tank, there is a case where a cutout portion for inserting the stringer is formed in the rib. There is a case where the rib and the stringer are relatively displaced due to a force from the outside. For this reason, a fuel tank dam is used to close a gap between the rib and the stringer while allowing the relative displacement between the rib and the stringer.

PTL 1 discloses a technique for suppressing a decrease in sealing properties following deformation by disposing a fuel tank dam having an elastic member that is easily deformed or a plurality of folded portions provided in a part in a fuel tank provided in a main wing of an aircraft or the like.

CITATION LIST

Patent Literature

[PTL 1] Japanese Unexamined Patent Application Publication No. 2015-54581

SUMMARY OF INVENTION

Technical Problem

The fuel tank dam disclosed in PTL 1 is provided with a so-called bellows having a plurality of folded portions, so that there is a possibility that sealing performance may be lowered in the vicinity of an end portion of the bellows which is fixed to a stringer or the like with a sealant or the like interposed therebetween.

The present invention provides a fuel tank dam in which it is possible to obtain sufficient sealing performance.

Solution to Problem

According to a first aspect of the present invention, there is provided a fuel tank dam that closes a gap between a first structural component fixed to an inner surface of an outer plate of a fuel tank and a second structural component having a cutout portion into which the first structural component is inserted. The fuel tank dam includes a first section, a second section, a third section, and a flange section. The first section can be fixed to the first structural component, and the second section can be fixed to the second structural component. The third section has a bellows having at least one folded portion and is disposed between the first section and the second section. The flange section extends along the outer plate from at least an edge portion of the third section.

With such a configuration, it is possible to fix the edge portion of the third section, which is disposed adjacent to the outer plate and is hardly deformed, to the outer plate through the flange section. For this reason, it is possible to increase the sealing properties between the third section and the outer plate. On the other hand, at the position away from the outer plate of the third section, the bellows can be deformed to follow the relative displacement between the first section and the second section. Therefore, it is possible to obtain sufficient sealing performance while allowing the relative displacement between the first structural component and the second structural component.

According to a second aspect of the present invention, in the fuel tank dam according to the first aspect, the bellows may be formed thinner than the first section and the second section.

With such a configuration, in a case where the first structural component and the second structural component are relatively displaced, the bellows can be deformed prior to the first section or the second section. Therefore, it is possible to suppress a decrease in sealing performance due to unintended deformation of the first section or the second section.

According to a third aspect of the present invention, in the fuel tank dam according to the first or second aspect, the flange section may be formed in a width wider than a thickness of the bellows.

With such a configuration, it is possible to secure necessary and sufficient sealing performance.

According to a fourth aspect of the present invention, in the fuel tank dam according to the first or second aspect, the flange section may be formed in a width wider than a depth of the bellows.

With such a configuration, the third section and the outer plate can be stably fixed to each other at the edge portion of the bellows. Therefore, it is possible to improve reliability.

According to a fifth aspect of the present invention, in the fuel tank dam according to any one of the first to fourth aspects, the flange section may be formed to extend over an edge portion of the first section and an edge portion of the third section.

With such a configuration, both of the gaps between the first section and the outer plate and the gaps between the third section and the outer plate can be simultaneously sealed by one continuous flange section. Further, the first section and the third section can be stably fixed to the outer plate.

According to a sixth aspect of the present invention, in the fuel tank dam according to the fifth aspect, the flange section may be formed to extend over the edge portion of the third section and an edge portion of the second section.

With such a configuration, the gaps between the first section, the second section, and the third section, and the outer plate can be simultaneously sealed by one continuous flange section. Further, the first section, the second section, and the third section can be stably fixed to the outer plate.

According to a seventh aspect of the present invention, in the fuel tank dam according to any one of the first to sixth aspects, the flange section may have a flat surface conforming to the inner surface of the outer plate.

With such a configuration, the flange section can be easily formed. Further, for example, when the flange section is fixed to the outer plate with a sealant or the like interposed therebetween, it is possible to easily perform the fixing work.

According to an eighth aspect of the present invention, in the fuel tank dam according to any one of the first to seventh aspects, the first section may be longer than the third section in a longitudinal direction of the first structural component.

With such a configuration, it is possible to stably fix the first section to the first structural component while suppressing an increase in the size of the fuel tank dam.

Advantageous Effects of Invention

According to the fuel tank dam described above, it is possible to obtain sufficient sealing performance.

DESCRIPTION OF EMBODIMENTS

Next, a fuel tank dam in an embodiment of the present invention will be described based on the drawings.

Figure 1:
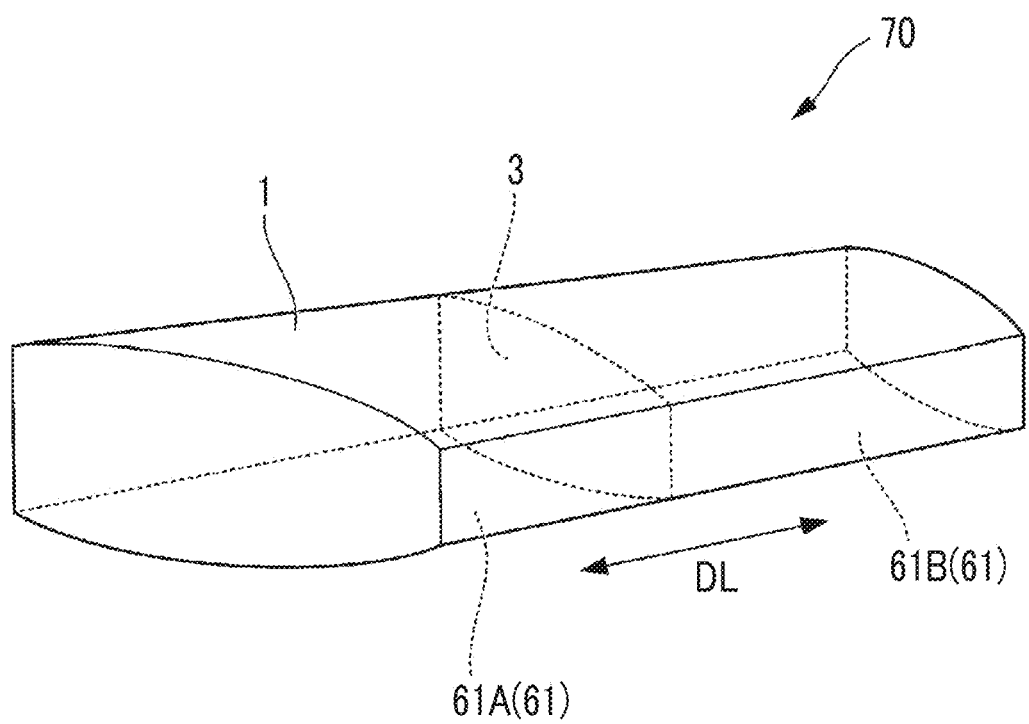
FIG. 1 is a perspective view showing a schematic configuration of a main wing in an embodiment of the present invention.
Figure 2:
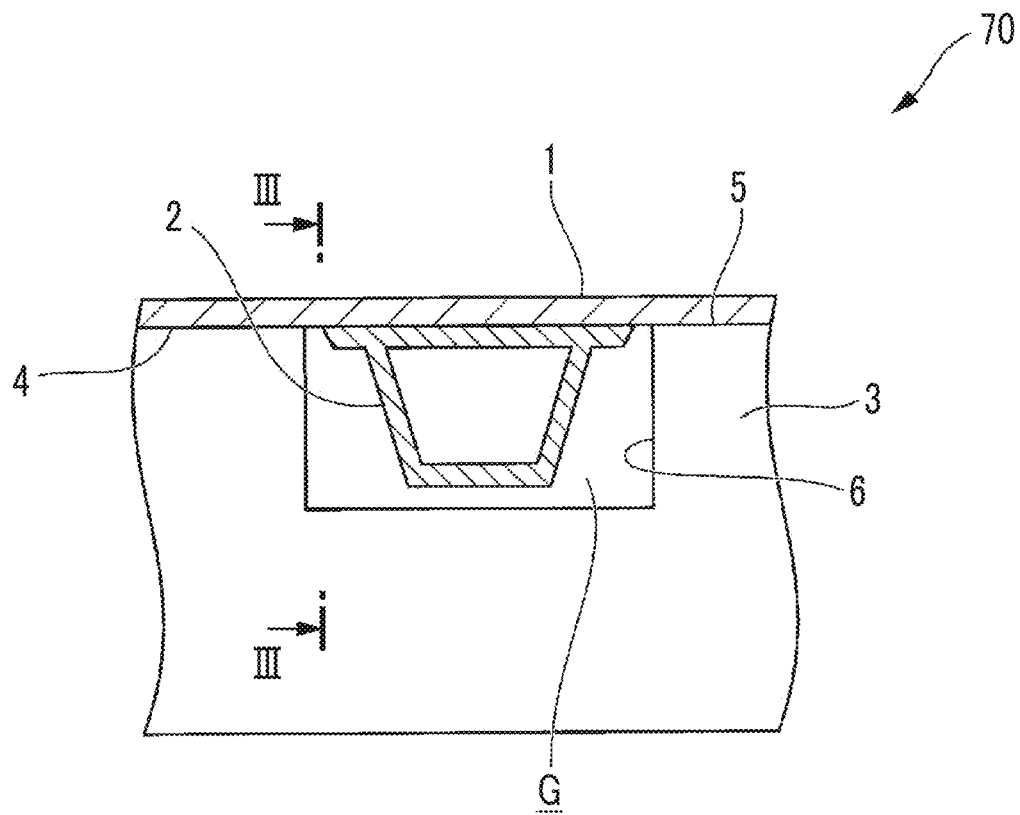
FIG. 2 is an enlarged sectional view of the periphery of a stringer of the main wing in the embodiment of the present invention.
Figure 3:
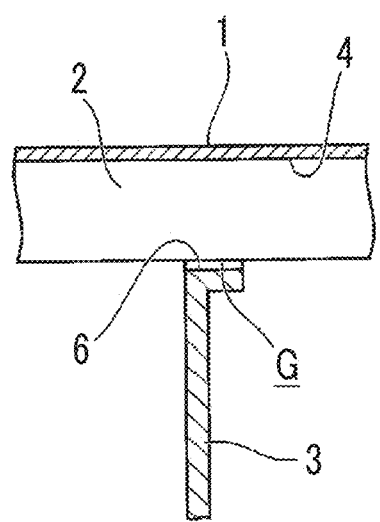
FIG. 3 is a sectional view taken along line III-III in FIG. 2.

FIG. 1 is a perspective view showing a schematic configuration of a main wing in the embodiment of the present invention. FIG. 2 is an enlarged sectional view of the periphery of a stringer of the main wing in the embodiment of the present invention. FIG. 3 is a sectional view taken along line III-III in FIG. 2.

As shown in FIGS. 1 to 3, a main wing 70 includes a skin (an outer plate) 1, a stringer (a first structural component) 2, and a rib (a second structural component) 3. In FIG. 1, the illustration of the stringer 2 is omitted.

The skin 1 is a plate material which defines the outer shape of the main wing 70. A fuel tank 61 is provided in the interior of the main wing 70 surrounded by the skin 1.

The stringer 2 is a strength member which extends in a longitudinal direction DL (refer to FIG. 1) of the main wing 70. As shown in FIGS. 2 and 3, the stringer 2 is fixed to an inner surface 4 of the skin 1. The stringer 2 illustrated in this embodiment is formed in a tubular shape having a hollow trapezoidal cross section in which a width decreases with increasing distance from the skin 1, as shown in FIG. 2. The shape of the stringer 2 is not limited to the shape illustrated in this embodiment.

As shown in FIG. 1, the rib 3 is provided in the interior of the main wing 70. The rib 3 is formed, for example, in a thin plate shape which extends in a direction intersecting the stringer 2. The rib 3 partitions the interior of the main wing 70, for example, in the longitudinal direction DL of the main wing 70. In this manner, the interior of the main wing 70 is partitioned by the rib 3, whereby a plurality of fuel tanks 61A and 61B are formed.

As shown in FIGS. 2 and 3, the rib 3 has a cutout portion 6 at a part of an end edge 5 which is joined to the skin 1. The cutout portion 6 is formed in a recessed shape toward the central portion of the rib 3 from the end edge 5 of the rib 3. The cutout portion 6 is formed such that the stringer 2 can be inserted in the longitudinal direction DL of the main wing 70. Due to the cutout portion 6, the rib 3 and the stringer 2 are not in direct contact with each other.

Figure 4:
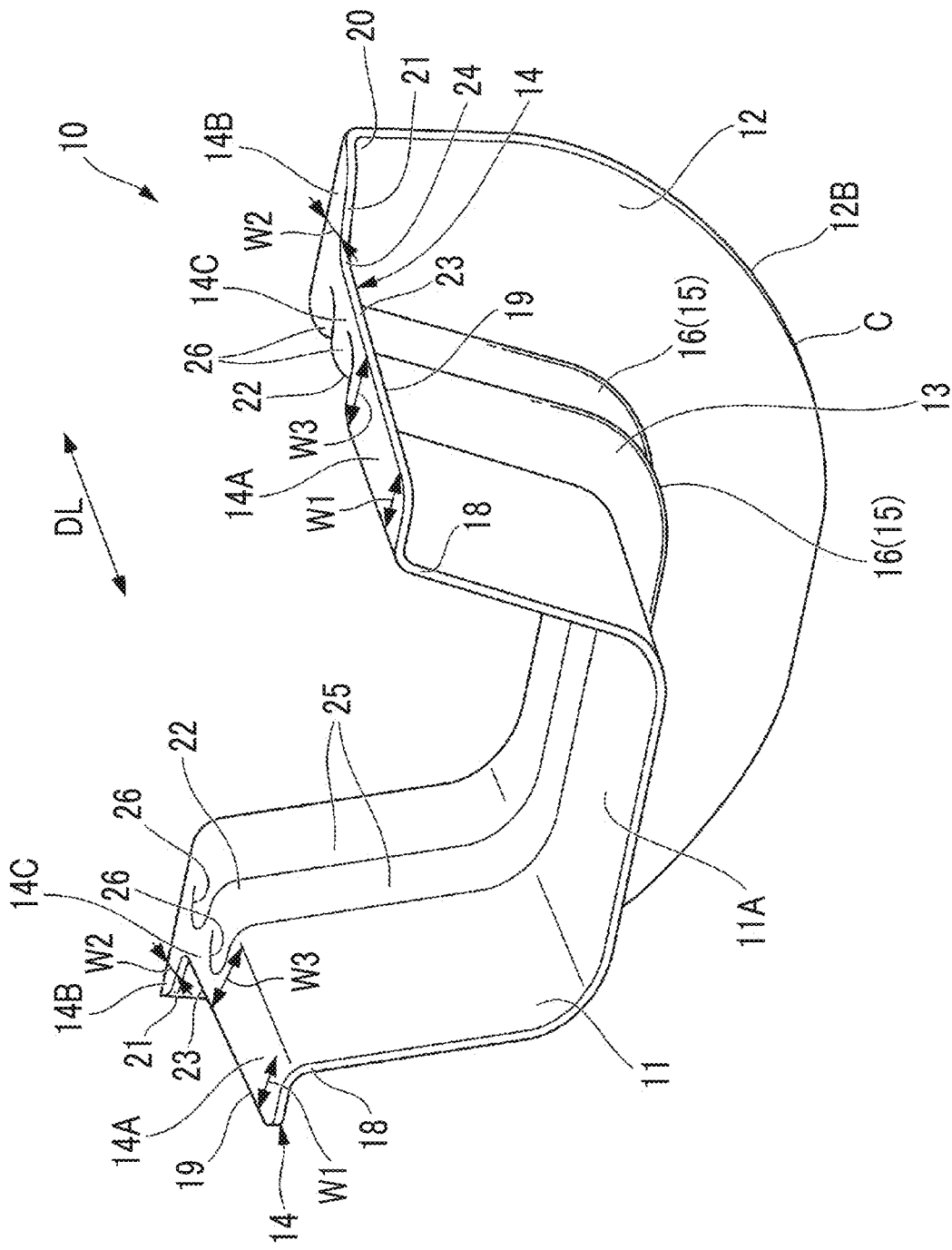
FIG. 4 is a perspective view of a fuel tank dam in the embodiment of the present invention.
Figure 5:
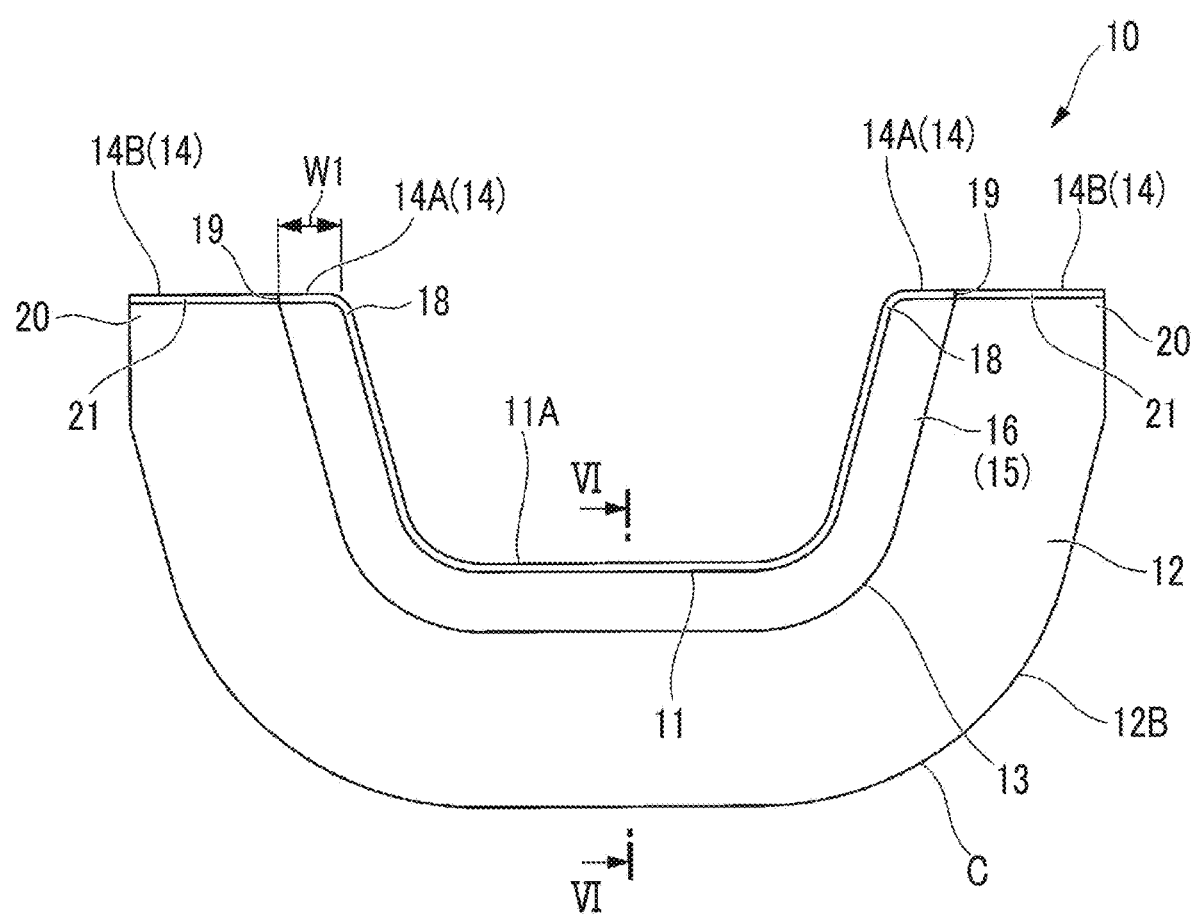
FIG. 5 is a front view of the fuel tank dam in the embodiment of the present invention as viewed from the first section side.
Figure 6:
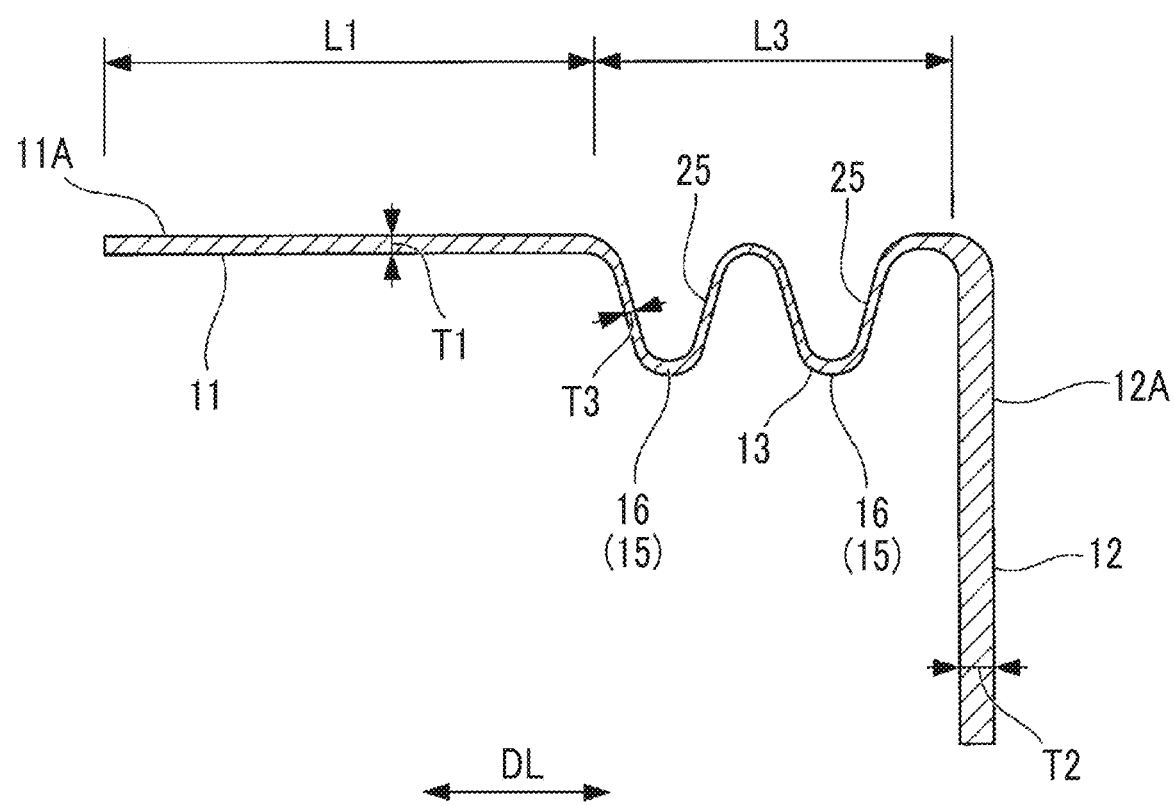
FIG. 6 is a sectional view taken along line VI-VI in FIG. 5.
Figure 7:
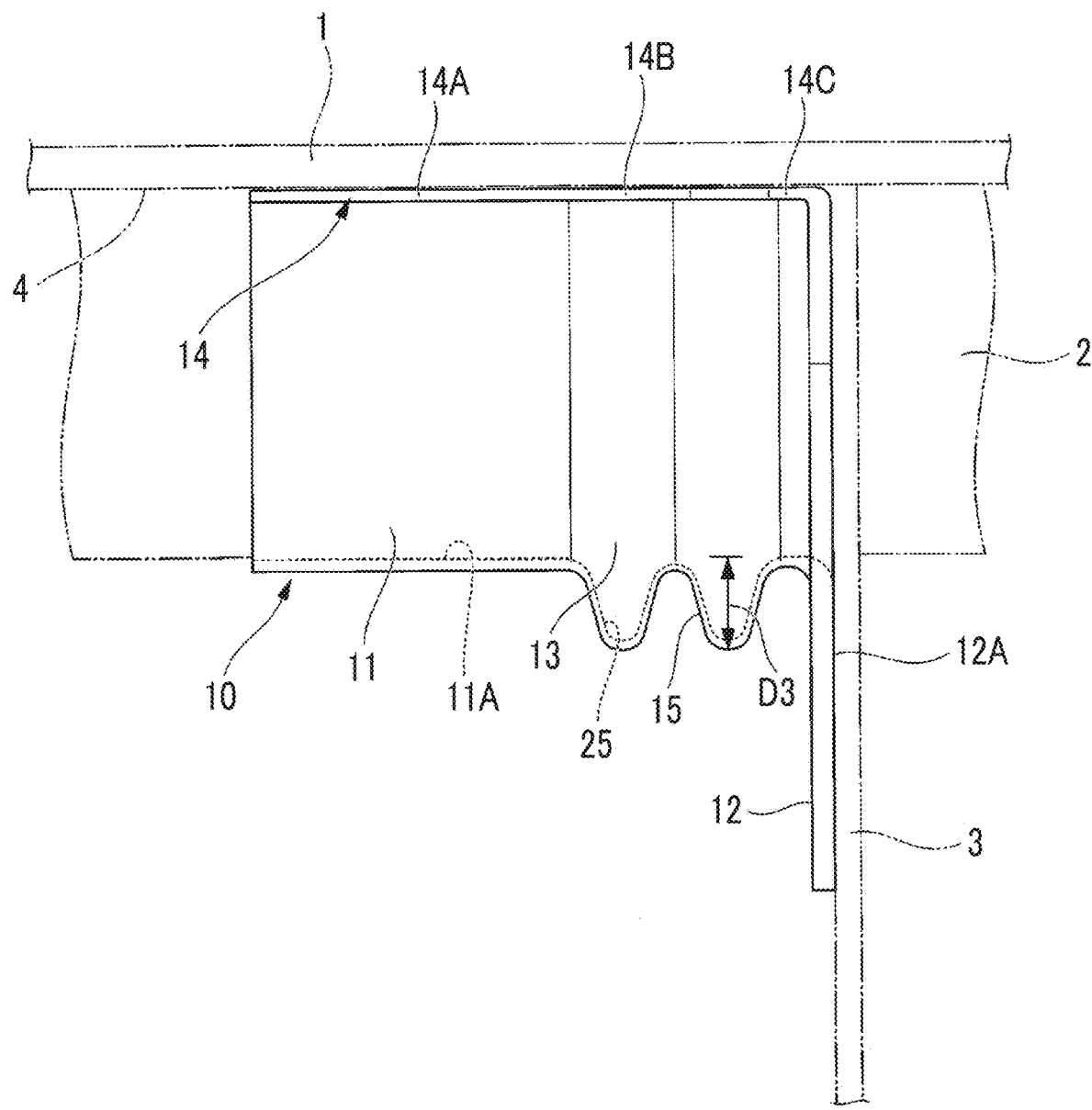
FIG. 7 is a side view of the fuel tank dam in the embodiment of the present invention.

FIG. 4 is a perspective view of a fuel tank dam in the embodiment of the present invention. FIG. 5 is a front view of the fuel tank dam in the embodiment of the present invention as viewed from the first section side. FIG. 6 is a sectional view taken along line VI-VI in FIG. 5. FIG. 7 is a side view of the fuel tank dam in the embodiment of the present invention.

A gap G between the rib 3 described above and the stringer 2 is closed by a fuel tank dam 10.

As shown in FIGS. 4 and 5, the fuel tank dam 10 includes a first section 11, a second section 12, a third section 13, and a flange section 14.

The first section 11 is a part which is fixed to the stringer 2. The first section 11 is formed so as to have a U-shaped cross section which covers the stringer 2 from the outside. An inner surface 11A of the first section 11 is fixed to the stringer 2 by bonding or the like with a sealant (not shown) interposed therebetween, for example.

The second section 12 is a part which is fixed to the rib 3. The second section 12 is formed in a plate shape which extends in a direction intersecting the first section 11. In other words, the second section 12 is formed in a plate shape extending along the rib 3. In the second section 12, a surface 12A (refer to FIGS. 6 and 7) facing the side opposite to the first section 11 in the longitudinal direction DL is fixed to the rib 3 by bonding or the like with a sealant interposed therebetween, for example. A case is illustrated where a curved portion C which is convex outward is formed at an outer edge 12B of the second section 12 illustrated in this embodiment. However, the shape of the outer edge 12B of the second section 12 is not limited to this shape.

As shown in FIG. 6, a thickness dimension T1 of the first section 11 illustrated in this embodiment is formed slightly thinner than a thickness dimension T2 of the second section 12. However, the second section 12 and the first section 11 may have the same thickness, or the first section 11 may be formed thicker than the second section 12.

The third section 13 is disposed between the first section 11 and the second section 12. The first section 11, the second section 12, and the third section 13 are integrally formed so as to be continuous by the same member. The first section 11 and the second section 12 are connected through the third section 13. The first section 11, the second section 12, and the third section 13 can be formed of, for example, a synthetic resin.

The third section 13 has a bellows 15 composed of a plurality of folded portions 16. The bellows 15 in this embodiment has two folded portions 16. Each of the folded portions 16 is formed so as to protrude outward in the thickness direction of the first section 11. The folded portion 16 extends such that a ridgeline thereof is continuous in a direction intersecting the longitudinal direction DL in which the stringer 2 extends. That is, each of the folded portions 16 is continuously formed so as to cover the stringer 2 in a U shape.

Here, the third section 13 is elastically deformed to allow the relative displacement of the first section 11 and the second section 12 according to the relative displacement between the stringer 2 and the rib 3 associated with the deformation of the main wing 70. The bellows 15 described above is formed thinner than the first section 11 and the second section 12, that is, formed such that the thickness thereof is thinner than those of the first section 11 and the second section 12, and thus the bellows 15 is more easily elastically deformed than the first section 11 and the second section 12. More specifically, a thickness dimension T3 of the entire bellows 15 is made thinner than the thickness dimension T1 of the thinnest portion of the first section 11 and/or the thickness dimension T2 of the thinnest portion of the second section 12. A case is illustrated where the thickness of the bellows 15 in this embodiment is uniform. However, it may not be uniform as long as it is in a range thinner than the first section 11 and the second section 12.

Further, a length L3 of the third section 13 illustrated in this embodiment is formed shorter than a length L1 of the first section 11 in the longitudinal direction DL in which the stringer 2 extends. In other words, the first section 11 is formed longer than the third section 13 in the longitudinal direction DL.

As shown in FIG. 7, the flange section 14 extends along the skin 1 and is fixed to the inner surface 4 of the skin 1 with a sealant interposed therebetween, for example. The flange section 14 includes a first flange section 14A, a second flange section 14B, and a third flange section 14C, each of which is continuous. Each of the first flange section 14A, the second flange section 14B, and the third flange section 14C illustrated in this embodiment is formed in a flat plate shape having a uniform continuous thickness, and has a flat surface conforming to the inner surface 4 of the skin 1.

As shown in FIGS. 4 and 5, the first flange section 14A extends toward the outer side (in other words, the side away) from each of two edge portions 18 which are located on the side close to the skin 1 of the first section 11 having the U-shaped cross section. In the first flange section 14A, an end edge 19 thereof on the side far from the first section 11 is formed in a linear shape parallel to the edge portion 18 of the first section 11 extending in the longitudinal direction DL. The first flange section 14A in this embodiment is formed in a strip shape long in the longitudinal direction DL. A width W1 of the first flange section 14A is formed to be smaller than the length L1 of the first section 11 in the longitudinal direction DL. Further, the width W1 of the first flange section 14A illustrated in this embodiment is formed to be larger than a depth dimension D3 (refer to FIG. 7) of the folded portion 16 of the bellows 15.

The second flange section 14B extends from an edge portion 20 on the side close to the skin 1 of the second section 12 toward the side where the first section 11 is disposed in the longitudinal direction DL. In the second flange section 14B, an end edge 21 thereof on the side far from the second section 12 is inclined so as to come close to the second section 12 with increasing distance from the bellows 15. That is, the second flange section 14B is formed in a tapered shape such that a width W2 thereof is gradually narrowed as it comes close to the outer edge 12B of the second section 12.

The third flange section 14C extends toward the outer side (in other words, the side away) from each of two edge portions 22 located on the side close to the skin 1 of the third section 13 formed to have a U-shaped cross section. A width W3 of the third flange section 14C is made to be larger than the thickness dimension T3 (refer to FIG. 6) of the bellows 15. The third flange section 14C in this embodiment is formed in a width wider than the depth dimension D3 (refer to FIG. 7) of the folded portion 16 having the largest depth, among the plurality of folded portions 16 configuring the bellows 15. The third flange section 14C is formed, whereby the bellows 15 is inhibited from elastic deformation in the vicinity of the third flange section 14C, and thus the bellows 15 becomes more difficult to be elastically deformed in the vicinity of the third flange section 14C than in a portion far from the third flange section 14C.

A plurality of recessed portions 26 which communicate with recessed grooves 25 formed inside the plurality of folded portions 16 of the bellows 15 are formed in the third flange section 14C. The cross-sectional shape of the recessed groove 25 and the cross-sectional shape of the recessed portion 26 are the same shape. That is, the recessed groove 25 formed inside the folded portion 16 communicates with a space above the third flange section 14C without being blocked by the third flange section 14C in the extending direction of the recessed groove 25.

In the third flange section 14C in this embodiment, an end edge 23 thereof on the side far from the bellows 15 is formed in a linear shape. More specifically, the end edge 23 of the third flange section 14C is formed in a linear shape extending in the longitudinal direction DL. Further, the end edge 23 of the third flange section 14C is formed continuously with the end edge 19 of the first flange section 14A described above. In other words, the end edge of the third flange section 14C is disposed on an extension line of the end edge 19 of the first flange section 14A formed in a linear shape. Then, the end edge 23 of the third flange section 14C in this embodiment and the end edge 21 of the second flange section 14B are connected through a concave curved portion 24. That is, the flange section 14 is formed so as to extend over the edge portion 18 of the first section 11 and the edge portion 20 of the second section 12. Further, the flange section 14 is formed so as to extend over the edge portion 20 of the second section 12 and the edge portion 22 of the third section 13.

Therefore, according to the embodiment described above, it is possible to increase the sealing properties between the third section 13 and the skin 1 by fixing the edge portion 22 of the third section 13, which is disposed adjacent to the skin 1 and is hardly deformed, to the skin 1 through the flange section 14. On the other hand, at the position away from the skin 1 of the third section 13, the bellows 15 can be deformed to follow the relative displacement between the first section 11 and the second section 12. Therefore, it is possible to obtain sufficient sealing performance while allowing the relative displacement between the stringer 2 and the rib 3.

Further, the bellows 15 is formed thinner than the first section 11 and the second section 12, so that, in a case where the stringer 2 and the rib 3 are relatively displaced, the bellows 15 can be deformed prior to the first section 11 or the second section 12. As a result, it is possible to suppress a decrease in sealing performance due to unintended deformation.

Further, the flange section 14 is formed in a width wider than the thickness of the bellows 15, so that the third section 13 and the skin 1 can be stably fixed to each other at the edge portion 22 of the third section 13 where the bellows 15 is formed. As a result, it is possible to improve reliability.

Further, the flange section 14 is formed in a width wider than the depth dimension D3 of the bellows 15, so that it is possible to secure necessary and sufficient sealing performance.

Further, the flange section 14 is formed so as to extend over the edge portion 18 of the first section 11 and the edge portion 22 of the third section 13, so that both of the gaps between the first section 11 and the skin 1 and the gaps between the third section 13 and the skin 1 can be simultaneously sealed by one continuous flange section 14. Further, the first section 11 and the third section 13 can be stably fixed to the skin 1.

Further, the flange section 14 is formed so as to extend over the edge portion 22 of the third section 13 and the edge portion 20 of the second section 12, so that the gaps between the first section 11, the second section 12, and the third section 13, and the skin 1 can be simultaneously sealed by one continuous flange section 14. Further, the first section 11, the second section 12, and the third section 13 can be stably fixed to the skin 1.

Further, the flange section 14 has a flat surface conforming to the inner surface 4 of the skin 1, so that the flange section 14 can be easily formed. Further, for example, when the flange section 14 is fixed to the skin 1 with a sealant or the like interposed therebetween, it is possible to easily perform the fixing work.

The present invention is not limited to the configuration of the embodiment described above, and a design change can be made within a scope which does not depart from the gist of the invention.

For example, in the embodiment described above, a case where the flange section 14 has a flat surface has been described. However, for example, the flange section 14 may have a curved surface corresponding to the inner surface 4 of the skin 1.

Further, in the embodiment described above, a case has been described where the first flange section 14A, the second flange section 14B, and the third flange section 14C are formed in a continuous series without interruption. However, the first flange section 14A, the second flange section 14B, and the third flange section 14C may be divided with minute gaps or the like formed therebetween.

Further, in the embodiment described above, a case where the folded portions 16 are connected by a curved surface is illustrated. However, it is favorable if the folded portion 16 has a shape in which a mountain fold and a valley fold are continuous, and the folded portion 16 is not limited to the shape described above.

Further, a case where two folded portions 16 are provided has been described. However, only one folded portion 16 may be provided or three or more folded portions 16 may be provided.

Further, in the embodiment described above, a case where the third flange section 14C is formed in a width wider than the depth dimension D3 of the folded portion 16 is illustrated. However, as long as a flat surface wider than the thickness of the bellows 15 is formed in at least a part of the edge portion 22 of the third section 13, the width of the third flange section 14C is not limited to the width W3 of the third flange section 14C described above.

Further, in the embodiment described above, a case where the first section 11 is formed longer than the third section 13 in the longitudinal direction DL in which the stringer 2 extends has been described. However, the length L1 of the first section 11 may be formed to be the same as the length L3 of the third section 13 or shorter than the length L3 of the third section 13, for example, in a case where a large number of folded portions 16 of the third section 13 are formed, or the like.

Further, in the embodiment described above, a case where the stringer 2 is formed so as to have a trapezoidal cross section is illustrated. However, the cross-sectional shape of the stringer 2 is not limited to a trapezoid. For example, it may be an I-cross section, an H-cross section, or the like. In a case where the stringer 2 does not have a trapezoidal shape in this manner, for example, it is favorable if a spacer or the like is provided between the fuel tank dam 10 of the embodiment described above and the stringer 2.

Further, in the embodiment described above, a case where the flange section 14 is fixed to the inner surface 4 of the skin 1 disposed on the upper side has been described. However, the direction in which the fuel tank dam 10 is mounted to the gap G is not limited to the direction described above.

Further, the size of the width W1 of the first flange section 14A is not limited to the size in the embodiment described above.

Further, in the embodiment described above, a case where the fuel tank 61 is provided in the main wing 70 has been described. However, the fuel tank 61 is not limited to a configuration in which it is provided in the main wing 70.

INDUSTRIAL APPLICABILITY

The present invention can be applied to a fuel tank dam. According to the present invention, it is possible to obtain sufficient sealing performance.

REFERENCE SIGNS LIST

1: skin (outer plate)
2: stringer
3: rib
4: inner surface
5: end edge
6: cutout portion
10: fuel tank dam
11: first section
11A: inner surface
12: second section
12A: surface
12B: outer edge
13: third section
14: flange section
15: bellows
16: folded portion
18: edge portion
19: end edge
20: edge portion
21: end edge
22: edge portion
23: end edge
24: curved portion
25: recessed groove
26: recessed portion
61: fuel tank
70: main wing
C: curved portion

The invention claimed is:

1. A fuel tank dam that closes a gap between a first structural component fixed to an inner surface of an outer plate of a fuel tank and a second structural component having a cutout portion into which the first structural component is inserted, the fuel tank dam comprising:
   a first section capable of being fixed to the first structural component and extending in a longitudinal direction of the first structural component;
   a second section capable of being fixed to the second structural component;
   a third section which has a bellows having at least one folded portion and is disposed between the first section and the second section; and a flange section extending along the outer plate and to be fixed to the inner surface of the outer plate, wherein the flange section includes at least:
- a first flange section that extends from a first edge portion of the first section located on a side close to the outer plate;
- a second flange section that extends from a second edge portion of the second section located on the side close to the outer plate; and
- a third flange section
  - that extends without interruption in the longitudinal direction along the outer plate from at least a third edge portion of the third section located on a side close to the outer plate,
  - that is configured to be fixed to the inner surface of the outer plate,
  - that is continuous with the first flange section and the second flange section, and
  - that has at least one recessed portion which communicates with a recessed groove formed inside said at least one folded portion, respectively.

2. The fuel tank dam according to claim 1, wherein the bellows is formed thinner than the first section and the second section.

3. The fuel tank dam according to claim 1, wherein the flange section is formed in a width wider than a thickness of the bellows.

4. The fuel tank dam according to claim 1, wherein the flange section is formed in a width wider than a depth of the bellows.

5. The fuel tank dam according to claim 1, wherein the flange section extends over the first edge portion and the third edge portion.

6. The fuel tank dam according to claim 5, wherein the flange section extends over the third edge portion and the second edge portion.

7. The fuel tank dam according to claim 1, wherein the flange section has a flat surface conforming to the inner surface of the outer plate.

8. The fuel tank dam according to claim 1, wherein the first section is longer than the third section in a longitudinal direction of the first structural component.

* * * * *